(12) United States Patent
Kitahara et al.

(10) Patent No.: US 7,286,463 B2
(45) Date of Patent: Oct. 23, 2007

(54) OBJECTIVE LENS AND OPTICAL PICKUP DEVICE USING IT

(75) Inventors: Yu Kitahara, Saitama (JP); Toshiaki Katsuma, Tokyo (JP); Masao Mori, Saitama (JP); Tetsuya Ori, Koshigaya (JP)

(73) Assignee: Fujinon Corporation, Saitama (JP)

( * ) Notice: Subject to any disclaimer, the term of this patent is extended or adjusted under 35 U.S.C. 154(b) by 569 days.

(21) Appl. No.: 10/988,638

(22) Filed: Nov. 16, 2004

(65) Prior Publication Data
US 2005/0105448 A1 May 19, 2005

(30) Foreign Application Priority Data
Nov. 17, 2003 (JP) .............................. 2003-386293

(51) Int. Cl.
*G11B 7/00* (2006.01)
(52) U.S. Cl. .............................. 369/112.08; 369/112.23
(58) Field of Classification Search ........... 369/112.08, 369/112.25, 112.05, 112.1, 112.23, 112.24, 369/112.26
See application file for complete search history.

(56) References Cited
U.S. PATENT DOCUMENTS
7,206,276 B2 * 4/2007 Kimura et al. ......... 369/112.08
2001/0008513 A1 7/2001 Arai et al.
2004/0047269 A1 * 3/2004 Ikenaka et al. ........ 369/112.08
2004/0170106 A1 * 9/2004 Komma ................... 369/112.1

* cited by examiner

Primary Examiner—Wayne Young
Assistant Examiner—Adam R. Giesy
(74) Attorney, Agent, or Firm—Arnold International; Jon W. Henry; Bruce Y. Arnold (57) ABSTRACT

An objective lens is formed as an objective lens element with a diffractive surface on one side. The objective lens focuses a collimated light beam of a first wavelength diffracted by the objective lens onto a first recording medium, a collimated light beam of a second wavelength diffracted by the objective lens onto a second recording medium, and a diverging light beam of a third wavelength diffracted by the objective lens onto a third recording medium. The three light beams are focused at three different working distances from the objective lens and the diffraction orders of the diffracted light of two of the light beams is the same. The objective lens satisfies certain conditions related to the shortest of the three different working distances, the focal length of the objective lens element at the shortest of the three wavelengths, and the thickness of the objective lens.

20 Claims, 4 Drawing Sheets

OBJECTIVE LENS AND OPTICAL PICKUP DEVICE USING IT

TECHNICAL FIELD OF THE INVENTION

The present invention relates to an objective lens for an optical recording medium that, when recording or reproducing information, efficiently converges light of any one of three different wavelengths onto an appropriate corresponding recording medium according to standardized characteristics such as numerical aperture of the objective lens used, the wavelength of the light selected, and the substrate thickness of the optical recording medium. The present invention also relates to an objective lens for an optical recording medium where a diffractive optical element is used to diffract light in order to efficiently focus light of any one of the three wavelengths onto a corresponding one of the three optical recording media, and it also relates to an optical pickup device using such an objective lens.

BACKGROUND OF THE INVENTION

In recent years, a variety of optical recording media have been developed and optical pickup devices that carry out recording and reproducing using two alternative types of optical recording media have been known. For example, devices that carry out recording or reproducing with either a DVD (Digital Versatile Disk) or a CD (Compact Disk including CD-ROM, CD-R, CD-RW) have been used. For these two optical recording media, the DVD uses visible light having a wavelength of, for example, approximately 657 nm for improved recording densities while the CD is required to use near-infrared light having a wavelength of approximately 790 nm because there are some recording media that have no sensitivity to visible light. A single optical pickup device, known as a dual-wavelength-type pickup device, uses irradiation light of these two different wavelengths. The two optical recording media described above require different numerical apertures (NA) due to their different features. For example, the DVD is standardized to use a numerical aperture of about 0.60-0.65 and the CD is standardized to use a numerical aperture in the range of 0.45-0.52. Additionally, the thicknesses of the two types of recording disks, including the thicknesses of protective layers or substrates made of polycarbonate (PC), are different. For example, the DVD may have a substrate thickness of 0.6 mm and the CD may have a substrate thickness of 1.2 mm.

As described above, because the substrate thickness of the optical recording medium is standardized and differs according to the type of optical recording medium, the amount of spherical aberration introduced by the substrate is different based on the different standardized thicknesses of the substrates of the different recording media. Consequently, for optimum focus of each of the light beams on the corresponding optical recording medium, it is necessary to optimize the amount of spherical aberration in each light beam at each wavelength for recording and reproducing. This makes it necessary to design the objective lens with different focusing effects according to the light beam and recording medium being used.

Additionally, in response to rapid increases of data capacity required each day, the demand for an increase in the recording capacity of recording media has been strong. It is known that the recording capacity of an optical recording medium can be increased by using light of a shorter wavelength and by increasing the numerical aperture (NA) of an objective lens. Concerning a shorter wavelength, the development of a semiconductor laser with a shorter wavelength using a GaN substrate (for example, a semiconductor laser that emits a laser beam of 408 nm wavelength) has advanced to the point where this wavelength is becoming practical.

With the development of short wavelength semiconductor lasers, research and development of AODs (Advanced Optical Disks), also known as HD-DVDs, that provide increased data storage capacity of a single layer on one side of an optical disk by using short wavelength light is also advancing. As the AOD standard, the numerical aperture and disk thickness are selected to be about the same as those of DVDs, as discussed previously, with the numerical aperture (NA) and disk substrate thickness for an AOD being set at 0.65 and 0.6 mm, respectively.

Furthermore, research and development of Blu-ray disk (BD) systems that use a shorter wavelength of disk illuminating light, similar to AOD systems, has progressed, and the standardized values of numerical aperture and disk thickness for these systems are completely different from the corresponding DVD and CD values, with a numerical aperture (NA) of 0.85 and a disk substrate thickness of 0.1 mm being standard. Unless otherwise indicated, hereinafter, AODs and Blu-ray disks collectively will be referred to as "AODs."

Accordingly, the development of an optical pickup device that can be used for three different types of optical recording media, such as AODs, DVDs and CDs as described above, has been demanded and objective lenses for mounting in such devices have already been proposed. For example, objective lenses that includes a diffractive surface on at least one objective lens surface are described in Japanese Laid-Open Patent Application 2001-195769. The objective lens described in this publication is designed to improve chromatic aberration generated in a single element objective lens and the spherical aberration that accompanies the difference in thickness of the substrates of each optical recording medium by using the diffracted light of a specified order from the diffractive surface corresponding to each of the optical recording media, such as the next generation of high density optical disks that may use, for example, light of a wavelength of 400 nm, as well as using diffracted light of a wavelength used with a DVD and diffracted light of a wavelength used with a CD.

In addition, the objective lens of Japanese Laid-Open Patent Application 2001-195769 is constructed so that a divergent light beam is incident on the diffractive surface when information is recorded on or reproduced from a CD, and the deterioration in tracking accuracy that occurs in conjunction with the deterioration of optical performance off the optical axis is controlled by using a collimated light beam incident on the diffractive surface when information is recorded on or reproduced from a DVD and when information is recorded on or reproduced from the next generation of high density optical disks, which may use light of a wavelength of 400 nm, where the numerical aperture NA is large.

In optical pickup devices using objective lenses as described above, the objective lens moves according to the tracking control and also moves in order to provide focusing. However, focusing and tracking efficiency may be impaired based on the mass of the objective lens and/or by the objective lens colliding with the optical recording medium, based on the varying working distance of the objective lens from the optical recording medium.

Avoiding problems in such tracking control and focusing is an extremely important issue, especially when recording and reproducing information with a plurality of optical recording media that use light beams of different wavelengths, that use different diffraction orders of different light beams, and that use different numerical apertures.

BRIEF SUMMARY OF THE INVENTION

The present invention relates to an objective lens for optical recording media that can efficiently focus each of three light beams on a corresponding one of three optical recording media with different technical standards of the substrate thickness, different wavelengths of the three light beams, and different numerical apertures (NAs) of the objective lens for each of the three light beams. The objective lens of the present invention uses a diffractive surface in order to achieve excellent and smooth focusing and tracking and also achieves excellent diffraction efficiency for all three light beams in both recording and reproducing information. The present invention further relates to an optical pickup device using this objective lens.

BRIEF DESCRIPTION OF THE DRAWINGS

The present invention will become more fully understood from the detailed description given below and the accompanying drawings, which are given by way of illustration only and thus are not limitative of the present invention, wherein.

DETAILED DESCRIPTION

The present invention relates to an objective lens for optical recording media that can be used to focus each of three different light beams of three different wavelengths, $\lambda_1$, $\lambda_2$, and $\lambda_3$, from a light source to a different desired position for each of the first, second and third optical recording media of substrate thicknesses, T1, T2, and T3, respectively, for recording and reproducing information.

Figure 1A:
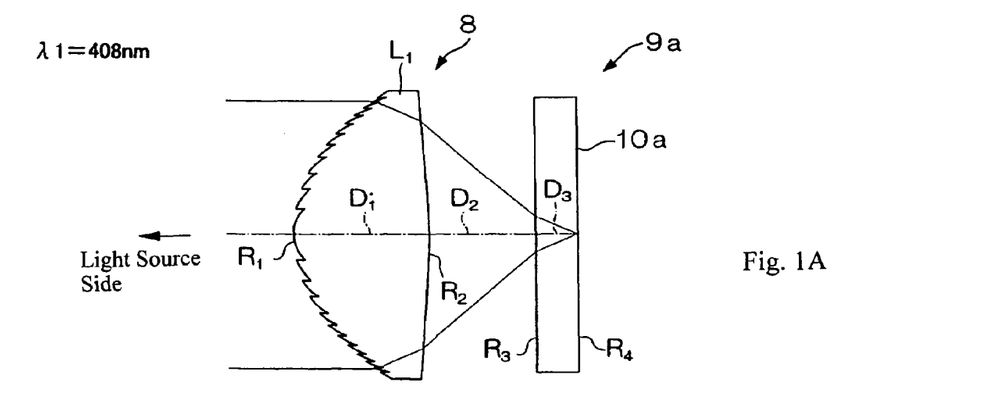
FIGS. 1A-1C are schematic diagrams that depict cross-sectional views of the objective lens of an embodiment of the present invention, with FIG. 1A showing the operation of the objective lens when used with optical recording medium 9a, with FIG. 1B showing the operation of the objective lens when used with a second optical recording medium 9b, and with FIG. 1C showing the operation of the objective lens when used with a third optical recording medium 9c.
Figure 1B:
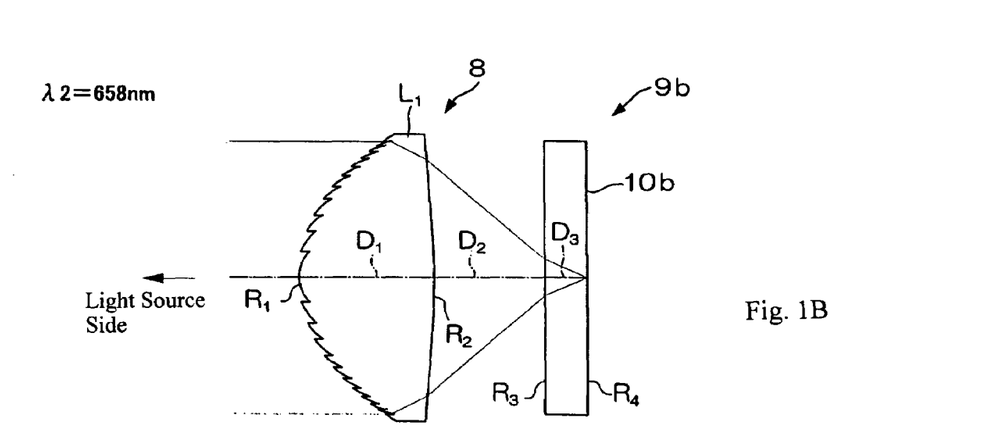
Figure 1C:
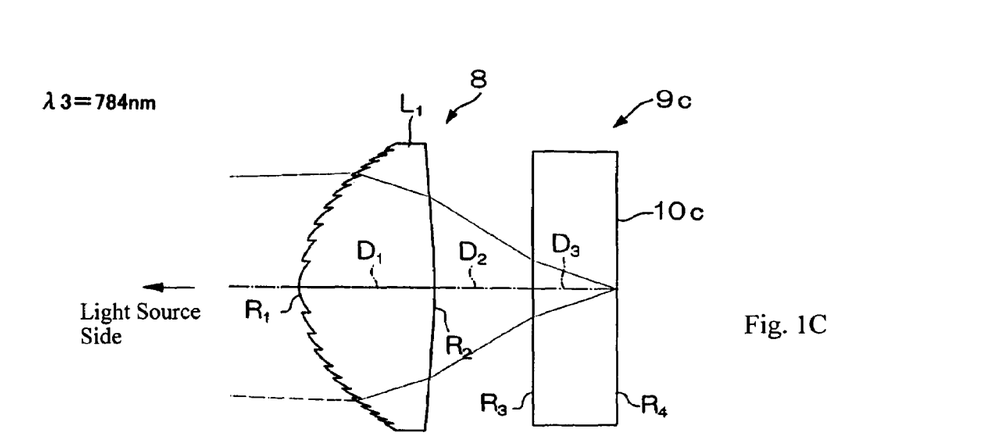
Figure 3:
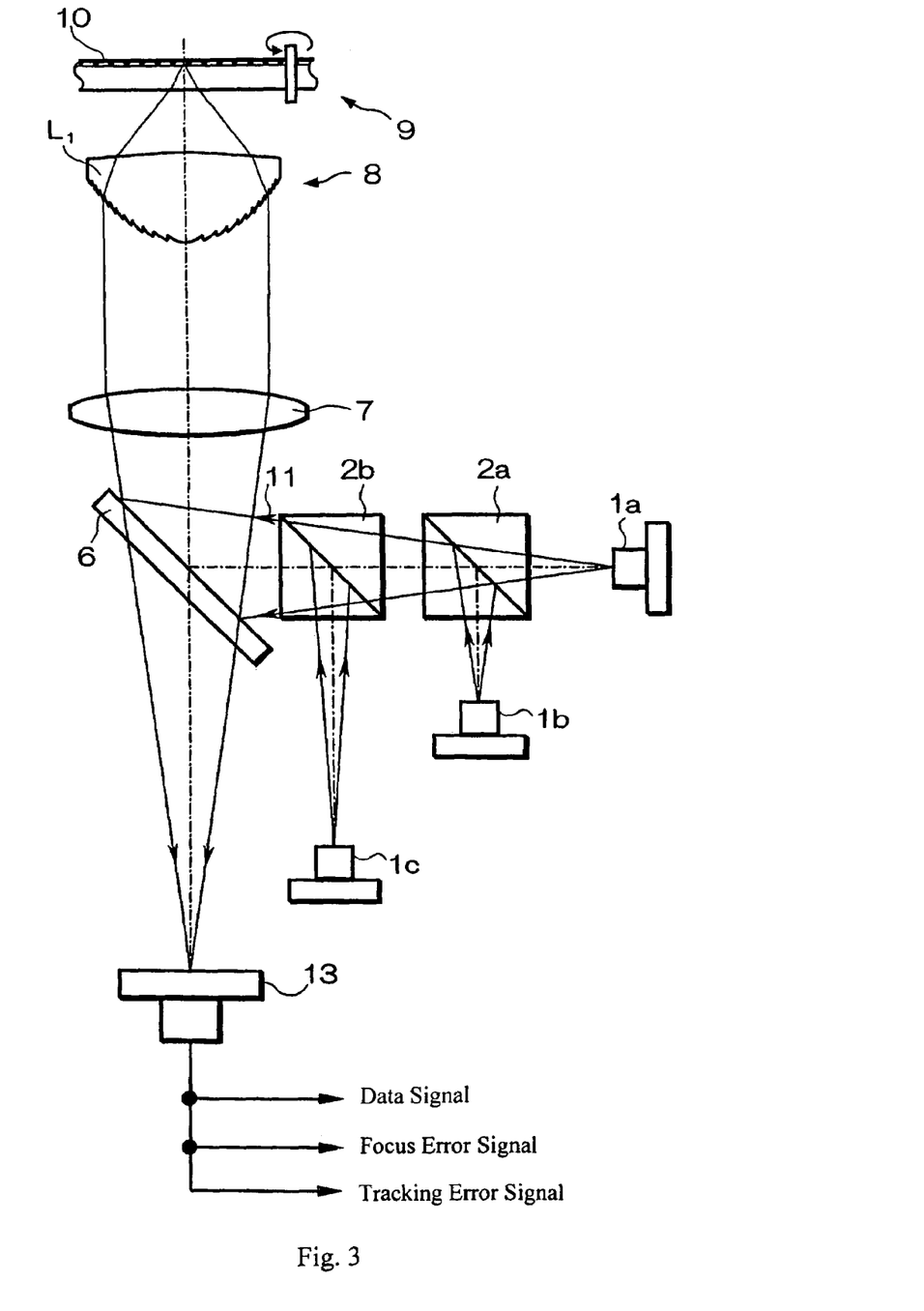
FIG. 3 is a schematic diagram of an optical pickup device using the objective lens of FIGS. 1A-1C.

An embodiment of the present invention is described hereafter with reference to the drawings. FIGS. 1A-1C are schematic diagrams that depict cross-sectional views of the objective lens of an embodiment of the present invention, with FIG. 1A showing the operation of the objective lens when used with optical recording medium 9a, with FIG. 1B showing the operation of the objective lens when used with a second optical recording medium 9b, and with FIG. 1C showing the operation of the objective lens when used with a third optical recording medium 9c. FIG. 3 is a schematic diagram of an optical pickup device using the objective lens of FIGS. 1A-1C. In FIG. 3, in order to avoid complicating the drawing, the edges of the optical beam from the semiconductor laser 1a are fully shown, and the edges of the optical beams from the semiconductor lasers 1b and 1c are shown only until they reach prisms 2a and 2b.

In the optical pickup device, the laser beam 11 output from the semiconductor lasers 1a-1c, as shown in FIG. 3, is reflected by the half mirror 6, and is made into a parallel or nearly parallel beam by the collimator lens 7 (the optical beam from the semiconductor laser 1c is made to be a slightly divergent beam). The laser beam 11 is then converted to a convergent beam by the objective lens 8 and then is irradiated onto the recording area 10 of the optical recording medium 9.

The three optical recording media used in the present invention satisfies the following conditions:

| | |
|---|---|
| $\lambda_1 < \lambda_2 < \lambda_3$ | Condition (1) |
| NA1 ≈ NA2 > NA3 | Condition (2) |
| T1 ≤ T2 < T3 | Condition (3) | where
- NA1 is the numerical aperture of the objective lens for light of the first wavelength $\lambda_1$ that is focused on the optical recording medium of substrate thickness T1,
- NA2 is the numerical aperture of the objective lens for light of the second wavelength $\lambda_2$ that is focused on the optical recording medium of substrate thickness T2, and
- NA3 is the numerical aperture of the objective lens for light of the third wavelength $\lambda_3$ that is focused on the optical recording medium of substrate thickness T3.

More specifically, as shown in FIGS. 1A-1C, the arrangement includes an optical recording medium 9a that is an AOD with a substrate thickness T1 of 0.6 mm used with a light beam of wavelength $X\lambda_1$ that is equal to 408 nm and with a numerical aperture NA1 of 0.65 (FIG. 1A), an optical recording medium 9b that is a DVD with a substrate thickness T2 of 0.6 mm used with a light beam of wavelength $\lambda_2$ that is equal to 658 nm and with a numerical aperture NA2 of 0.65 (FIG. 1B), and an optical recording medium 9c that is a CD with a substrate thickness T3 of 1.2 mm used with a light beam of wavelength $\lambda_3$ that is equal to 784 nm and with a numerical aperture NA3 of 0.51 (FIG. 1C).

The semiconductor laser 1a emits the visible laser beam having the wavelength of approximately 408 nm ($\lambda_1$) for AODs. The semiconductor laser 1b emits the visible laser beam having the wavelength of approximately 658 nm ($\lambda_2$) for DVDs. The semiconductor laser 1c emits the near-infrared laser beam having the wavelength of approximately 784 nm ($\lambda_3$) for CDs such as CD-R (recordable optical recording media) (hereinafter the term CD generally represents CDs of all types).

The arrangement of FIG. 3 does not preclude semiconductor lasers 1a-1c providing simultaneous outputs. However, it is preferable that the lasers be used alternately depending on whether the optical recording media 9 of FIG. 3 is specifically, as shown in FIGS. 1A-1C, an AOD 9a, a DVD 9b, or a CD 9c. As shown in FIG. 3 the laser beam output from the semiconductor lasers 1a, 1b irradiates the half mirror 6 by way of prisms 2a, 2b, and the laser beam output from the semiconductor laser 1c irradiates the half mirror 6 by way of the prism 2b.

The collimator lens 7 is schematically shown in FIG. 3 as a single lens element. However, it is desirable to use a collimator lens made up of more than one lens element in order to better correct chromatic aberration of the collimator lens 7 for the wavelengths being used.

In the optical pickup device of the present invention, each of the optical recording media 9, as shown in FIG. 3, whether an AOD 9a, a DVD 9b or a CD 9c shown in FIGS. 1A-1C, respectively, must be arranged at a predetermined position along the optical axis, for example, on a turntable, so that the recording region 10 of FIG. 3 (one of recording regions 10a, 10b, and 10c of an AOD 9a, a DVD 9b and a CD 9c of FIGS. 1A-1C) is positioned at the focus of the light beam of the corresponding wavelength ($\lambda 1$, $\lambda 2$, and $\lambda 3$ for recording regions 10a, 10b, and 10c, respectively) in order to properly record signals and reproduce recorded signals.

In the recording region 10, pits carrying signal information are arranged in tracks. The reflected light of a laser beam 11 is made incident onto the half mirror 6 by way of the objective lens 8 and the collimator lens 7 while carrying the signal information, and the reflected light is transmitted through the half mirror 6. The transmitted light is then incident on a four-part photodiode 13. The respective quantities of light received at each of the four parts of the four-part photodiode 13 are converted to electrical signals that are operated on by calculating circuits (not shown in the drawings) in order to obtain data signals and respective error signals for focusing and tracking.

Because the half mirror 6 is inserted into the optical path of the return light from the optical recording media 9 at an angle of forty-five degrees to the optical axis, the half mirror 6 introduces astigmatism into the light beam, as a cylindrical lens may introduce astigmatism, whereby the amount of focusing error may be determined according to the form of the beam spot of the return light on the four-part photodiode 13. Also, a grating may be inserted between the semiconductor lasers 1a-1c and the half mirror 6 so that tracking errors can be detected using three beams.

The objective lens of the present invention is formed so that focusing and tracking can be performed smoothly and favorably while recording and reproducing information with diffraction efficiencies balanced so that the diffraction efficiencies of light beams of all three wavelengths $\lambda 1$, $\lambda 2$, and $\lambda 3$ are high. As shown in FIGS. 1A-1C and FIG. 3, the objective lens has positive refractive power and includes, from the light source side: a lens element $L_1$ with a first rotationally symmetric convex aspheric surface on which a diffractive surface is formed and a second rotationally symmetric convex surface. The phase function $\Phi$ is chosen so that the objective lens is able to focus each of the three different light beams of three different wavelengths, $\lambda 1$, $\lambda 2$, and $\lambda 3$, at a different desired position for each of the first, second and third optical recording media of substrate thicknesses, T1, T2, and T3, respectively.

In FIGS. 1A-1C, the radii of curvature of the surfaces of the objective lens 8 (lens element $L_1$) and the recording media 9a, 9b, and 9c are referenced by the letter R followed by a number denoting their order from the light source side of the objective lens 8, from $R_1$ to $R_4$. The on-axis surface spacings along the optical axis between these surfaces are referenced by the letter D followed by a number denoting their order from the light source side of the objective lens 8, from $D_1$ to $D_3$.

When an AOD 9a or a DVD 9b is used, the light beam is incident on the objective lens 8 as a collimated light beam, but when a CD 9c is used, the light beam is incident on the objective lens 8 as a diverging light beam. Additionally, it is preferable that the diffractive surface has a configuration so as to provide the greatest quantity of diffracted light in the second-order for the laser beam for the AOD with a light wavelength of 408 nm ($\lambda 1$), so as to provide the greatest quantity of diffracted light in the first-order for the laser beam for the DVD with a light wavelength of 658 nm ($\lambda 2$), and in addition, so as to provide the greatest quantity of diffracted light in the first-order for the laser beam for the CD with a light wavelength of 784 nm ($\lambda 3$). This enables better balancing of diffraction efficiencies than using the same diffraction order for all three wavelengths. Furthermore, the objective lens 8 is designed so that each of the highly efficiently diffracted light beams is focused on the corresponding recording region 10a, 10b, or 10c, as shown in FIGS. 1A-1C, respectively.

Figure 4:
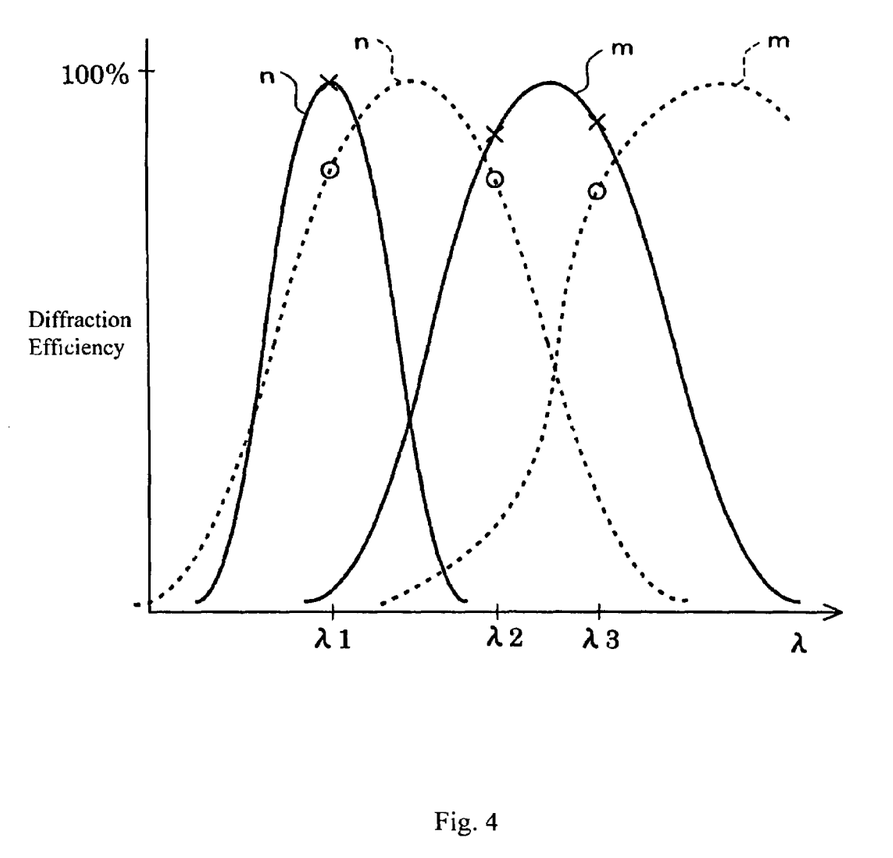
FIG. 4 is a graph of diffraction efficiencies versus wavelengths for two different orders and two different diffractive designs of the objective lens of FIGS. 1A-1C.

FIG. 4 is a graph of diffraction efficiencies versus wavelengths for two different orders and two different diffractive designs of the objective lens of FIGS. 1A-1C. In FIG. 4, $m^{th}$-order diffracted light is referenced by m and $n^{th}$-order diffracted light is referenced by n. The solid line curves relate to a first mode of the present invention, described in the previous paragraph, and the broken line curves relate to a second mode of the present invention. As shown in FIG. 4, in the first mode of the present invention, diffraction efficiencies given by the "X" positions on the solid lines curves can be achieved for the wavelengths $\lambda 1$, $\lambda 2$, and $\lambda 3$. Alternatively, as shown by the broken lines curves of FIG. 4, somewhat less diffraction efficiencies can be achieved for the wavelengths $\lambda 1$, $\lambda 2$, and $\lambda 3$ by a different design, as indicated by the three small circles in FIG. 4 aligned with the wavelengths $\lambda 1$, $\lambda 2$, and $\lambda 3$. In the preferable embodiment of the present invention that will be described in detail later, the two light beams of specified wavelengths for which the same diffraction order is used among wavelengths $\lambda 1$, $\lambda 2$, and $\lambda 3$ have the smallest difference in wavelength among wavelengths $\lambda 1$, $\lambda 2$, and $\lambda 3$; that is, as shown in FIG. 4, wavelength $\lambda 1$ differs from wavelengths $\lambda 2$ and $\lambda 3$ more than wavelengths X $\lambda$ and $\lambda 3$ differ from one another; however, that is not necessarily the case. As shown in FIG. 4, by selecting a diffraction order n, for example, n=2 or the second diffraction order, for the light beam of wavelength $\lambda 1$, different from the diffraction order m, for example, m=1 or the first diffraction order, for the light beams of wavelengths $\lambda 2$ and $\lambda 3$, similar diffraction efficiencies can be achieved as shown by the solid line curves and the "X" denoted points on these curves. Alternatively, by selecting a diffraction order n, for example, n=2 or the second diffraction order, for the light beams of wavelengths $\lambda 1$ and $\lambda 2$, different from the diffraction order m, for example, m=1 or the first diffraction order, for the light beam of wavelength $\lambda 3$, similar diffraction efficiencies can be achieved as shown by the broken line curves and the points denoted by small circles on these curves. In either case, high diffraction efficiencies for the three light beams can be achieved.

Additionally, in either case, the diffractive surface is formed with a cross-sectional configuration of serrations that define a grating. In the embodiment shown by solid line curves in FIG. 4, second-order diffracted light diffracted by the lens element $L_1$ is focused onto the desired position at recording region 10a of the first optical recording medium 9a when the first light beam of wavelength λ1 is incident on the diffractive optical element as collimated light; first-order diffracted light diffracted by the lens element $L_1$ is focused onto the desired position at recording region 10b of the second optical recording medium 9b when the second light beam of wavelength λ2 is incident on the diffractive optical element as collimated light; and first-order diffracted light diffracted by the lens element $L_1$ is focused onto the desired position at recording region 10c of the third optical recording medium 9c when the third light beam of wavelength λ3 is incident on the diffractive optical element as diverging light.

Additionally, the objective lens 8 of the present invention is constructed so that the following conditions are satisfied:

$WDs/f \geq 0.46$ ... Condition (4)

$t/f \leq 0.70$ ... Condition (5)

where
  WDs is the shortest working distance from the recording medium side of the objective lens 8 to the objective lens side of the recording medium among the three working distances for the three wavelengths λ1, λ2, and λ3;
  f is the focal length of the objective lens 8 for the wavelength λ1; and
  t is the on-axis thickness of the objective lens 8.

By satisfying Condition (4), problems of the objective lens 8 colliding with the optical recording medium when the objective lens 8 is moved along the optical axis for focusing during both recording and reproducing information can be avoided with all three recording media.

Furthermore, by satisfying Condition (5), the objective lens can be made thinner, which results in the objective lens being lighter. This, in turn, enables faster response speeds and response times for focusing and tracking.

In addition, although when a CD 9c is used, the light beam is incident on the objective lens 8 as a diverging light beam, when an AOD 9a or a DVD 9b is used, the light beam is incident on the objective lens 8 as a collimated light beam to provide a large numerical aperture (NA) while recording and reproducing information. This enables freedom in the arrangement, particularly enabling a compact arrangement, and enables wide choices in the design of the optical system. Furthermore, this enables improving the stability of tracking while improving the diffraction efficiency of a short wavelength irradiation beam that is particularly used for recording or reproducing information with an AOD.

The lens surfaces that are aspheric are defined using the following rotationally symmetric aspheric equation:

$Z = [(C \cdot Y^2)/\{1+(1-K \cdot C^2 \cdot Y^2)^{1/2}\}] + \Sigma A_i \cdot Y^{2i}$    Equation (A)

where
  Z is the length (in mm) of a line drawn from a point on the aspheric lens surface at a distance Y from the optical axis to the tangential plane of the aspheric surface vertex,
  C is the curvature (=1/the radius of curvature, R in mm) of the aspheric lens surface on the optical axis,
  Y is the distance (in mm) from the optical axis,
  K is the eccentricity, and
  $A_i$ is an aspheric coefficient, and the summation extends from i=2 upwards.

By using rotationally symmetric lens surfaces expressed in terms of Equation (A), accurate focusing with excellent correction of aberrations can be provided on a selected recording medium 9, and accurate tracking as well as excellent recording and reproducing of information can be achieved.

Additionally, at least one of the aspheric surfaces of the objective lens 8 expressed in terms of Equation (A) is used as a base for the diffractive surface formed with a "sawtooth" or serrated shape in cross-section, defining a kinoform. FIGS. 1A-1C and FIG. 4 exaggerate the actual size of the serrations of the diffractive surface. The serrations result in phase differences in portions of a light beam that passes through different serrations at different distances from the optical axis.

The diffractive surface adds a difference in optical path length equal to $M \cdot \lambda \cdot \Phi/(2\pi)$ to the diffracted light, where λ is the wavelength, Φ is the phase function of the diffractive optical surface, and M is the order of the diffracted light that is focused on a recording medium 9. The phase function Φ is given by the following equation:

$\Phi = \Sigma W_i \cdot Y^{2i}$    Equation (B)

where
  Y is the distance in mm from the optical axis; and
  $W_i$ is a phase function coefficient.

The specific heights of the serrated steps of the diffractive surface of the lens element $L_1$ are based on ratios of diffracted light of different orders for the light beams of different wavelengths λ1, λ2, and λ3. Additionally, the outer diameter of the diffractive surface can be determined by taking into consideration the numerical aperture (NA) and the beam diameter of the incident laser beam 11 (as shown in FIG. 3) of each of the three wavelengths.

The diffractive surface is formed on the rotationally symmetric aspheric surfaces of the objective lens 8, and the position of the recording medium 9 is set so as to focus each of the three beams of light of the three wavelengths λ1, λ2, and λ3 on a corresponding recording region 10, as shown in FIG. 3 (10a, 10b, 10c, as shown in FIGS. 1A-1C, respectively) with excellent correction of aberrations.

Preferably, the calculated diffraction efficiency of the diffracted light from the diffractive surface for each of the wavelengths λ1, λ2, and λ3 is 90% or more.

As shown in FIGS. 1A-1C and FIG. 3, the objective lens 8 is formed as a single lens element $L_1$.

As indicated in FIGS. 1A-1C, the objective lens 8 favorably focuses light of each wavelength, λ1 of 408 nm, λ2 of 658 nm, and λ3 of 784 nm, onto a respective recording region 10a, 10b, or 10c of respective recording media 9a, 9b, and 9c, which are an AOD, a DVD, and a CD, respectively. Additionally, as shown in FIGS. 1A-1C, the objective lens operates with an infinite conjugate on the light source side with the substantially collimated light beams of wavelengths λ1 and λ2 and with a finite conjugate on the light source side with a divergent light beam of wavelength λ3.

A particular embodiment of the objective lens 8 and recording medium 9 arrangement of the present invention will now be described. Table 1 below lists the surface #, in order from the light source side, the surface type or radius of curvature (in this case, the radii of curvature are given for planar surfaces, which have a radius of curvature of infinity), the on-axis distance (in mm) between surfaces for the three used wavelengths (λ1=408 nm for the AOD 9a, 2=658 nm for the DVD 9b, and λ3=784 nm for the CD 9c), and the refractive indexes at the three used wavelengths.

TABLE 1

| # | Surface Type or Radius of Curvature | Surface Spacing $\lambda 1 = 408$ nm | Surface Spacing $\lambda 2 = 658$ nm | Surface Spacing $\lambda 3 = 784$ nm | Refractive Index $\lambda 1 = 408$ nm | Refractive Index $\lambda 2 = 658$ nm | Refractive Index $\lambda 3 = 784$ nm |
|---|---|---|---|---|---|---|---|
| 1 | diffractive/aspheric | 1.960 | 1.960 | 1.960 | 1.55637 | 1.54076 | 1.53704 |
| 2 | aspheric | 1.540 | 1.603 | 1.456 | | | |
| 3 | ∞ | 0.600 | 0.600 | 1.200 | 1.62000 | 1.58000 | 1.57000 |
| 4 | ∞ | | | | | | |

Table 2 below lists, for each used wavelength, the diaphragm diameter (in mm), the focal length f (in mm), the numerical aperture NA, the apparent light source position (in mm, as measured from the diffractive surface of the lens element $L_1$), the diffraction order of the diffracted light being used, and the diffraction efficiency.

TABLE 2

| | $\lambda 1 = 408$ nm | $\lambda 2 = 658$ nm | $\lambda 3 = 784$ nm |
|---|---|---|---|
| diaphragm diameter | 3.90 | 3.99 | 3.32 |
| focal length, f | 3.00 | 3.08 | 3.10 |
| numerical aperture, NA | 0.65 | 0.65 | 0.51 |
| light source position | ∞ | ∞ | −46.71 |
| diffraction order used | 2 | 1 | 1 |
| diffraction efficiency | 98.1% | 92.0% | 99.6% |

Table 3 below lists the values of the constants C, K and the aspheric coefficients $A_2$-$A_5$ of each aspheric surface (numbered from the light source side) of this embodiment that are used in Equation (A) above. An "E" in the data indicates that the number following the "E" is the exponent to the base 10. For example, "1.0E-2" represents the number $1.0 \times 10^{-2}$. Aspheric coefficients that are not listed in Table 3 are zero.

TABLE 3

| | 1$^{st}$ Surface | 2$^{nd}$ Surface |
|---|---|---|
| C | 5.1915943E−1 | −1.2710179E−1 |
| K | 0.0 | 0.0 |
| $A_2$ | 9.3160008E−3 | 1.8058246E−2 |
| $A_3$ | 7.4954054E−4 | −4.3685599E−3 |
| $A_4$ | 2.8970890E−5 | 6.1764051E−4 |
| $A_5$ | −2.3146404E−6 | −3.8380507E−5 |

Table 4 below lists the values of the phase function coefficients $W_1$-$W_5$ that are used in Equation (B) above for the 1$^{st}$ surface that forms the diffractive surface of the lens element $L_1$ of this embodiment. Phase function coefficients not listed in Table 4 are zero. An "E" in the data indicates that the number following the "E" is the exponent to the base 10. For example, "1.0E-2" represents the number $1.0 \times 10^{-2}$.

TABLE 4

| | |
|---|---|
| $W_1$ | 4.1902526 |
| $W_2$ | 5.7692027 |
| $W_3$ | 1.6068312 |
| $W_4$ | −3.7954649E−1 |
| $W_5$ | 7.2230333E−2 |

The level difference, that is, the distance along the optical axis between adjacent peaks and valleys of the serrations of the diffractive surface of the objective lens 8, is 1.41 microns. Additionally, this embodiment of the present invention satisfies Conditions (4) and (5) when used with an AOD and $\lambda 1$ with the objective lens 8 having a focal length 3.00 as is clear from Table 5 below:

TABLE 5

| Condition No. | Condition | Value |
|---|---|---|
| (4) | WDs/f ≧ 0.46 | 0.485 |
| (5) | t/f ≦ 0.70 | 0.653 |

Figure 2A:
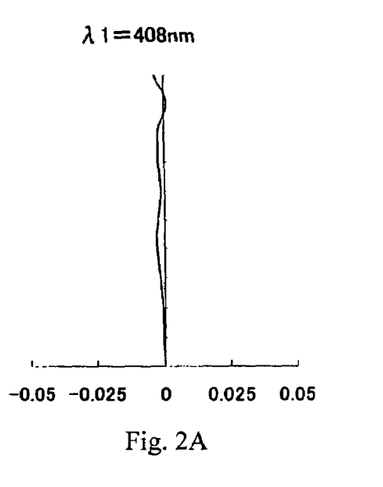
FIGS. 2A-2C illustrate wavefront aberration profiles of the light beams of three wavelengths that are focused to spots by the objective lens of the embodiment of FIGS. 1A-1C of the present invention, with FIG. 2A illustrating the wavefront aberration profile of the light beam of the first wavelength that is focused to a spot for the first optical recording medium, with FIG. 2B illustrating the wavefront aberration profile of the light beam of the second wavelength that is focused to a spot for the second optical recording medium, and with FIG. 2C illustrating the wavefront aberration profile of the light beam of the third wavelength that is focused to a spot for the third optical recording medium, with the numbers on the abscissa in each figure indicating the wavefront aberration in units of wavelength.
Figure 2B:
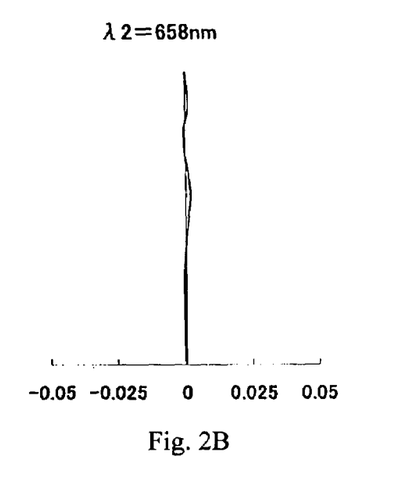
Figure 2C:
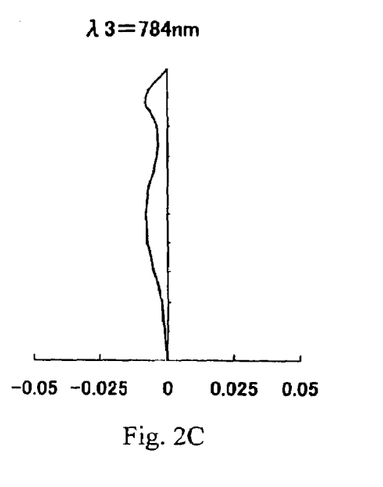

FIGS. 2A-2C illustrate wavefront aberration profiles of the light beams of three wavelengths being imaged to a spot by the objective lens of this embodiment of the present invention, with FIG. 2A illustrating the wavefront aberration profile of the light beam of the first wavelength being imaged to a spot for the first optical recording medium 9a, which is an AOD, with FIG. 2B illustrating the wavefront aberration profile of the light beam of the second wavelength being imaged to a spot for the second optical recording medium 9b, which is a DVD, and with FIG. 2C illustrating the wavefront aberration profile of the light beam of the third wavelength being imaged to a spot for the third optical recording medium 9c, which is a CD.

The objective lens for optical recording media of the present invention being thus described, it will be obvious that it can be varied in many ways. Likewise, the optical pickup device of the present invention being thus described, it will also be obvious that it can be varied in many ways. For example, as a material for forming the objective lens, using a plastic material enables the formation of a light and inexpensive objective lens.

Additionally, although in the embodiment described above, the light source side of the diffractive optical element is the diffractive surface and the surface facing the optical recording medium is not diffractive, the location of these two surfaces can be switched. Also, a convex spherical surface can be used instead of one or both of the convex aspheric surfaces.

Furthermore, in the diffractive surface diffracting light of one of the three wavelengths of a predetermined order, it is preferable that a large quantity of light be diffracted, particularly as close to one hundred percent as is practical. Additionally, the structure of the diffractive optical surface is not limited to serrations but may also be formed, for example, as stepped structures.

Additionally, in the embodiment described above, light beams with two wavelengths having the smallest wavelength difference use the same diffraction order; however, light beams that do not have the smallest wavelength difference may use the same diffraction order.

Additionally, in the objective lens for optical recording media and the optical pickup device of the present invention, the optical recording media which are used for recording and reproducing are not limited to AODs, DVDs, and CDs. For example, instead of the AOD in the above described embodiments, a Blu-ray disk arrangement with a numerical aperture (NA) of 0.85, a recording medium substrate thickness of 0.1 mm, and a light beam with a wavelength of approximately 405 nm may be used.

Furthermore, even in the case when an AOD, a DVD and a CD are used as the optical recording media, as in the embodiment described above, the wavelengths of the light beams used are not limited to the particular values described above. For example, even if a light beam with a wavelength other than 408 nm is used for the AOD, a light beam with a wavelength other than 658 nm is used for the DVD, or a light beam with a wavelength other than 784 nm is used for the CD, as long as the beam of light to be used satisfies the technical standards described above for each optical recording medium, the wavelengths can be varied within a broad range. Additionally, broad variations apply to the choices of numerical apertures and the substrate thicknesses within the scope of the present invention.

Furthermore, although, as generally described above, the optical pickup device includes three light emitting devices that emit light beams of different wavelengths that are separately combined, combining the light beams can be further integrated. For example, light beams of different wavelengths may be produced at adjacent output ports and, for example, a single prism used to combine the light beams instead of two prisms (as shown with regard to prisms $2a$ and $2b$ of FIG. 3). Additionally, in the optical pickup devices, a diaphragm or an aperture limiting element with wavelength selectivity can be arranged at the light source side of the objective lens and/or the lens element $L_1$. Such variations are not to be regarded as a departure from the spirit and scope of the invention. Rather, the scope of the invention shall be defined as set forth in the following claims and their legal equivalents. All such modifications as would be obvious to one skilled in the art are intended to be included within the scope of the following claims.

What is claimed is:

1. An objective lens for focusing light from a light source onto optical recording media, the objective lens comprising, in order from the light source side along an optical axis:
   an objective lens element that includes a diffractive surface on at least one side; wherein
   the objective lens is configured to receive a collimated light beam of a first wavelength $\lambda 1$ on its light source side and to focus diffracted light of a particular order diffracted by the diffractive surface of the objective lens element with highest diffraction efficiency onto a desired portion of a first optical recording medium, to receive a collimated light beam of a second wavelength $\lambda 2$ on its light source side and to focus diffracted light of a particular order diffracted by the diffractive surface of the objective lens element with highest diffraction efficiency onto a desired portion of a second optical recording medium, and to receive a diverging light beam of a third wavelength $\lambda 3$ on its light source side and to focus diffracted light of a particular order diffracted by the diffractive surface of the objective lens element with highest diffraction efficiency onto a desired portion of a third optical recording medium;
   the particular order of highest diffraction efficiency of diffracted light is the same for light beams of two of the three wavelengths and different from the particular order of highest diffraction efficiency of the light beam of the other one of the three wavelengths;
   and the following conditions are satisfied:

$$\lambda 1 < \lambda 2 < \lambda 3$$

$$WDs/f \geq 0.46$$

$$t/f \leq 0.70$$

where
   WDs is the shortest working distance from the recording medium side of the objective lens element to the objective lens side of the recording medium among the three working distances for the three wavelengths $\lambda 1$, $\lambda 2$, and $\lambda 3$;
   f is the focal length of the objective lens element for the wavelength $\lambda 1$; and
   t is the on-axis thickness of the objective lens element.

2. The objective lens according to claim 1 wherein, among the three wavelengths, the smallest difference in wavelength is the difference in wavelength between the two light beams for which the particular order of highest diffraction efficiency of diffracted light is the same.

3. The objective lens according to claim 2, wherein wavelengths of the light beams for which the particular order of highest diffraction efficiency of diffracted light is the same are $\lambda 2$ and $\lambda 3$.

4. The objective lens of claim 1, wherein the calculated diffraction efficiency of each of the light beams for the particular order of highest diffraction efficiency of diffracted light is 90% or more.

5. The objective lens of claim 2, wherein the calculated diffraction efficiency of each of the light beams for the particular order of highest diffraction efficiency of diffracted light is 90% or more.

6. The objective lens of claim 3, wherein the calculated diffraction efficiency of each of the light beams for the particular order of highest diffraction efficiency of diffracted light is 90% or more.

7. The objective lens of claim 1, wherein:
   the first optical recording medium is an AOD;
   the second optical recording medium is a DVD; and
   the third optical recording medium is a CD.

8. The objective lens of claim 2, wherein:
   the first optical recording medium is an AOD;
   the second optical recording medium is a DVD; and
   the third optical recording medium is a CD.

9. The objective lens of claim 3, wherein:
   the first optical recording medium is an AOD;
   the second optical recording medium is a DVD; and
   the third optical recording medium is a CD.

10. An optical pickup device that includes the objective lens according to claim 1.

11. The objective lens of claim 1, wherein the objective lens includes only a single lens element.

12. The objective lens according to claim 11 wherein, among the three wavelengths, the smallest difference in wavelength is the difference in wavelength between the two light beams for which the particular order of highest diffraction efficiency of diffracted light is the same.

13. The objective lens according to claim 12, wherein wavelengths of the light beams for which the particular order of highest diffraction efficiency of diffracted light is the same are $\lambda 2$ and $\lambda 3$.

14. The objective lens of claim 11, wherein the calculated diffraction efficiency of each of the light beams for the particular order of highest diffraction efficiency of diffracted light is 90% or more.

15. The objective lens of claim 12, wherein the calculated diffraction efficiency of each of the light beams for the particular order of highest diffraction efficiency of diffracted light is 90% or more.

16. The objective lens of claim 13, wherein the calculated diffraction efficiency of each of the light beams for the particular order of highest diffraction efficiency of diffracted light is 90% or more.

17. The objective lens of claim 11, wherein:
the first optical recording medium is an AOD;
the second optical recording medium is a DVD; and
the third optical recording medium is a CD.

18. The objective lens of claim 12, wherein:
the first optical recording medium is an AOD;
the second optical recording medium is a DVD; and
the third optical recording medium is a CD.

19. The objective lens of claim 13, wherein:
the first optical recording medium is an AOD;
the second optical recording medium is a DVD; and
the third optical recording medium is a CD.

20. An optical pickup device that includes the objective lens according to claim 11.

* * * * *

UNITED STATES PATENT AND TRADEMARK OFFICE
CERTIFICATE OF CORRECTION

PATENT NO. : 7,286,463 B2 Page 1 of 1
APPLICATION NO. : 10/988638
DATED : October 23, 2007
INVENTOR(S) : Kitahara et al.

It is certified that error appears in the above-identified patent and that said Letters Patent is hereby corrected as shown below:

Col. 4
line 28, change "NA1 24 NA2>NA3" to --NA1≥NA2>NA3--;
line 46, change "Xλ1" to --λ1--;

Col. 5
line 19, change "1 0a, 1 0b, and 10c" to --10a, 10b, and 10c--; and

Col. 6
line 46, change "X λand" to --λ2 and--.

Signed and Sealed this

Eleventh Day of March, 2008

JON W. DUDAS
*Director of the United States Patent and Trademark Office*